(12) United States Patent
Jones et al.

(10) Patent No.: US 9,063,284 B2
(45) Date of Patent: Jun. 23, 2015

(54) LIGHT CONTROL FILM

(75) Inventors: Vivian W. Jones, Woodbury, MN (US); Silva K. Theiss, Woodbury, MN (US); Mark E. Gardiner, Santa Rosa, CA (US); Michael E. Lauters, Hudson, WI (US); Gary E. Gaides, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 422 days.

(21) Appl. No.: 13/378,221

(22) PCT Filed: Jun. 16, 2010

(86) PCT No.: PCT/US2010/038815
§ 371 (c)(1),
(2), (4) Date: Mar. 5, 2012

(87) PCT Pub. No.: WO2010/148082
PCT Pub. Date: Dec. 23, 2010

(65) Prior Publication Data
US 2012/0154885 A1    Jun. 21, 2012

Related U.S. Application Data

(60) Provisional application No. 61/218,228, filed on Jun. 18, 2009.

(51) Int. Cl.
*G02B 5/22*    (2006.01)
(52) U.S. Cl.
CPC . *G02B 5/22* (2013.01); *G02B 5/223* (2013.01)

(58) Field of Classification Search
CPC .......... G02B 5/003; G02B 5/045; G02B 5/22; G02B 5/223; G02B 19/0047; G02B 27/30; G02B 2207/123; G02B 27/0994; G03B 21/14
USPC .......... 359/452, 454, 613, 614, 885, 227, 858
See application file for complete search history.

(56) References Cited

U.S. PATENT DOCUMENTS

| 4,267,814 A | 5/1981 | Benson |
| 4,576,850 A | 3/1986 | Martens |
| 4,621,898 A | 11/1986 | Cohen |
| 4,766,023 A | 8/1988 | Lu |
| 5,022,797 A | 6/1991 | Sawa |

(Continued)

FOREIGN PATENT DOCUMENTS

| JP | 2003-66206 | 3/2003 |
| JP | 2004-012918 | 1/2004 |

(Continued)

OTHER PUBLICATIONS

Evans, R. W., and Allen, D. M., "Fabricating diamond microtools with focused ion beam machining", Proceedings of the euspen International Conference, 5 pages, Zurich, May 2008.

(Continued)

*Primary Examiner* — James Phan
(74) *Attorney, Agent, or Firm* — Daniel J. Iden

(57) ABSTRACT

Light control films, and a method for manufacturing tools used to microreplicate light control films.

9 Claims, 2 Drawing Sheets

(56) References Cited

U.S. PATENT DOCUMENTS

| | | | |
|---|---|---|---|
| 5,204,160 | A | 4/1993 | Rouser |
| 5,254,388 | A | 10/1993 | Melby et al. |
| 5,462,700 | A | 10/1995 | Beeson |
| 5,481,385 | A | 1/1996 | Zimmerman |
| 5,486,949 | A | 1/1996 | Schrenk et al. |
| 5,612,820 | A | 3/1997 | Schrenk et al. |
| 5,783,120 | A | 7/1998 | Ouderkirk et al. |
| 5,825,543 | A | 10/1998 | Ouderkirk et al. |
| 5,828,488 | A | 10/1998 | Ouderkirk et al. |
| 5,839,823 | A | 11/1998 | Hou |
| 5,882,774 | A | 3/1999 | Jonza et al. |
| 6,111,696 | A | 8/2000 | Allen et al. |
| 6,297,908 | B1 | 10/2001 | Suga |
| 6,353,204 | B1 | 3/2002 | Spaay |
| 6,398,370 | B1 | 6/2002 | Chiu et al. |
| 6,417,966 | B1 | 7/2002 | Moshrefzadeh |
| 6,636,355 | B2 | 10/2003 | Moshrefzadeh |
| 6,822,792 | B2 | 11/2004 | Goto |
| 7,057,810 | B2 | 6/2006 | Thomas |
| 7,180,210 | B1 | 2/2007 | Jorgenson et al. |
| 7,180,664 | B2 | 2/2007 | Goto |
| 7,184,210 | B2 | 2/2007 | Thomas |
| 7,271,955 | B2 | 9/2007 | Osawa |
| 7,686,463 | B2 | 3/2010 | Goto |
| 7,746,554 | B2 | 6/2010 | Katura |
| 7,835,078 | B2 | 11/2010 | Ichikawa |
| 7,922,357 | B2 | 4/2011 | Jo et al. |
| 8,012,567 | B2 | 9/2011 | Gaides |
| 8,013,807 | B2 | 9/2011 | Cha |
| 2002/0167725 | A1 | 11/2002 | Goto |
| 2005/0041311 | A1 | 2/2005 | Mi |
| 2005/0213245 | A1 | 9/2005 | Katsura |
| 2006/0103779 | A1 | 5/2006 | Amemiya et al. |
| 2006/0104084 | A1 | 5/2006 | Amemiya et al. |
| 2006/0145578 | A1 | 7/2006 | Park |
| 2006/0245060 | A1 | 11/2006 | Goto |
| 2007/0153377 | A1 | 7/2007 | Goto |
| 2007/0160811 | A1 | 7/2007 | Gaides et al. |
| 2009/0213593 | A1 | 8/2009 | Foley |
| 2009/0284836 | A1 | 11/2009 | Boyd |
| 2010/0201242 | A1 | 8/2010 | Liu |
| 2010/0271721 | A1* | 10/2010 | Gaides et al. ................. 359/885 |
| 2010/0328777 | A1 | 12/2010 | Kashiwagi |

FOREIGN PATENT DOCUMENTS

| | | |
|---|---|---|
| JP | 2004-062084 | 2/2004 |
| JP | 2005-338270 | 8/2005 |
| JP | 2006-084876 | 3/2006 |
| JP | 2006-085050 | 3/2006 |
| JP | 2007-030095 | 2/2007 |
| JP | 2008-158530 A | 7/2008 |
| JP | 2008-304674 A | 12/2008 |
| JP | 2009-210834 A | 9/2009 |
| KR | 10-0753591 | 8/2007 |
| KR | 10-2008-0038778 | 5/2008 |
| WO | WO 2009/052052 | 4/2009 |
| WO | WO 2009/085581 | 7/2009 |

OTHER PUBLICATIONS

Evans, R. W., and Allen, D. M., "Fabricating diamond microtools with focused ion beam machining", Presentation Slides from Proceedings of the euspen International Conference, 11 pages, Zurich, May 2008.

Search Report for International Application No. PCT/US2010/038815, 3 pages, Date of Mailing Jan. 21, 2011.

Written Opinion for International Application No. PCT/US2010/038815, 6 pages, Date of Mailing Jan. 21, 2011.

* cited by examiner

LIGHT CONTROL FILM

CROSS REFERENCE TO RELATED APPLICATIONS

This application is a national stage filing under 35 U.S.C. 371 of PCT/US2010/038815, filed on Jun. 16, 2010, which claims priority to U.S. Provisional Application No. 61/218,228, filed on Jun. 18, 2009, the disclosure of which is incorporated by reference in its/their entirety herein.

FIELD OF THE INVENTION

This description relates to light control films and tools for microreplicating such films. In particular, the description relates to light control films having improved transmission of light and tools used for microreplicating such films.

BACKGROUND

Light control film (LCF), also known as light collimating film, is an optical film that is configured to regulate the transmission of light. Various LCFs are known, and typically include a light transmissive film having a plurality of parallel grooves wherein the grooves are formed of a light-absorbing material.

LCFs can be placed proximate a display surface, image surface, or other surface to be viewed. Typically, at normal incidence, (i.e., 0 degree viewing angle) where a viewer is looking at an image through the LCF in a direction that is perpendicular to the film surface, the image is viewable. As the viewing angle increases, the amount of image light transmitted through the LCF decreases until a viewing cutoff angle is reached where substantially all the image light is blocked by the light-absorbing material and the image is no longer viewable. This can provide privacy to a viewer by blocking observation by others that are outside a typical range of viewing angles.

LCFs can be prepared by molding and ultraviolet curing a polymerizable resin on a polycarbonate substrate. Such LCFs are commercially available from 3M Company, St. Paul, Minn., under the trade designation "3M™ Filters for Notebook Computers and LCD Monitors".

SUMMARY

Advances in display technology have resulted in brighter, higher resolution and more energy efficient displays that consumers want. The brightness and/or resolution of a display may be reduced when an LCF is positioned in front of the display for security or other purposes. It may be desirable to have an LCF which does not reduce the brightness and/or resolution of a display. It may further be desirable to have an LCF with improved performance, including higher transmission along the major viewing axis and reduced pixel Moiré, as well as a thinner configuration. A thinner configuration may result in more potential applications and cost reduction.

In one aspect, the present description relates to a light control film having a light input surface and a light output surface opposite the light input surface. The light control film further comprises alternating transmissive and non-transmissive regions disposed between the light input surface and the light output surface. Each of the transmissive regions has a width, W', at it narrowest region, and the successive transmissive regions have an average pitch, P of 0.040 mm or less. In this aspect, W'/P may be greater than 0.75.

In another aspect, the present description relates to a light control film having a light input surface and a light output surface opposite the light input surface. The light control film further comprises alternating transmissive and non-transmissive regions disposed between the light input surface and the light output surface. The successive transmissive regions have an average pitch, P of 0.040 mm or less. Further, light incident on the light input surface exits the light output surface having a maximum relative brightness ratio (RBR)in the major viewing axis direction of 65 or greater and an effective polar viewing angle (EPVA) of 45° or less.

In yet another aspect, the present description relates to a light control film having a light input surface and a light output surface opposite the light input surface. The light control film further comprises alternating transmissive and non-transmissive regions disposed between the light input surface and the light output surface, and each transmissive region has a first width, $W_O$, at the output surface, and a second width, $W_I$, at the input surface, where the distance from the output surface to the input surface is H, and wherein H divided by the absolute value of $[W_O - W_I]$ is greater than 40. Light incident on the light input surface exits the light output surface having a maximum relative brightness ratio (RBR) in the major viewing axis direction of 65 or greater and an effective polar viewing angle (EPVA) of 45° or less.

In a fourth aspect, the present description relates to a light control film having a light input surface and a light output surface opposite the light input surface. The light control film further comprises alternating transmissive and non-transmissive regions disposed between the light input surface and the light output surface. The first interface between each transmissive and non-transmissive region forms a first interface angle $\theta_I$ of 1° or less measured from a direction normal to the plane of the film. Light incident on the light input surface exits the light output surface having a maximum relative brightness ratio (RBR in the major viewing axis direction of 65 or greater and an effective polar viewing angle (EPVA) of 45° or less.

In another aspect, the present invention relates to a light control film having a light input surface and a light output surface opposite the light input surface. The light control film further comprises alternating transmissive and non-transmissive regions disposed between the light input surface and the light output surface, and has a distance from the light output surface to the light input surface of less than 0.080 mm. Light incident on the light input surface exits the light output surface having a maximum relative brightness ratio (RBR in the major viewing axis direction of 65 or greater and an effective polar viewing angle (EPVA) of 45° or less.

In a final aspect, the present invention relates to a method for manufacturing a tool, the method having the following steps: lapping or grinding the top of a v-shaped diamond to produce a flat with a given width, grinding or scaifing both facets of the v-shaped diamond to produce a column-like structure beneath the flat; and, ion milling the edges of the column to produce a smooth cutting edge.

BRIEF DESCRIPTION OF THE DRAWINGS

Throughout the specification reference is made to the appended drawings, where like reference numerals designate like elements, and wherein.

DETAILED DESCRIPTION

Figure 1:
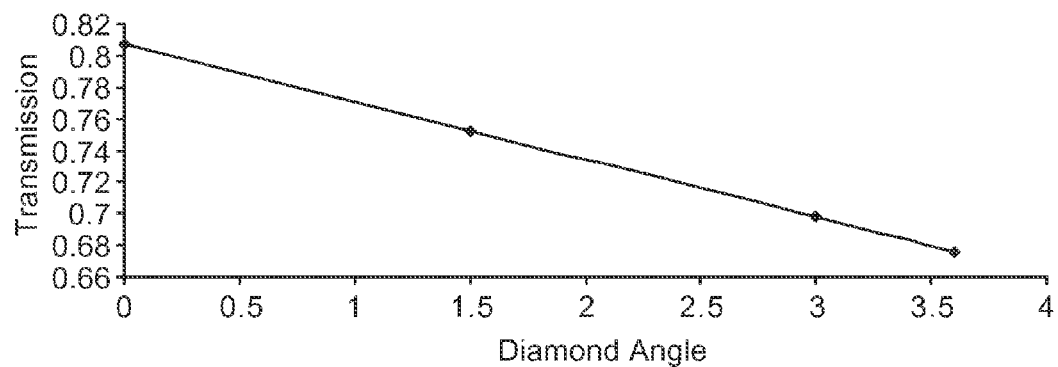
FIG. 1 is a plot of Diamond Angle of a tool used to microreplicate an LCF vs. Light transmission of the LCF.

In some embodiments, the present application is directed to an LCF having an increased brightness and uniformity of transmitted light while maintaining a well-defined viewing cutoff angle. In particular, some embodiments the present application provide an LCF having a combination of one or more of the following properties: a smaller non-transmissive or transmissive region pitch, an aspect ratio of top surface to base of non-transmissive regions closer to unity, index of refraction selection for non-transmissive and transmissive regions selected so as to reduce or eliminate total internal reflections (TIR), a lower (or even eliminated) bias angle for onset of Moiré, a higher on-axis brightness, and a smaller aspect ratio of non-transmissive region to transmissive region.

Reducing or eliminating the bias angle for onset of Moirécan be very important to LCF users or installers. For instance, LCFs are often intended to work at a bias angle of 0° or 90°. That is, the louver orientation is often intended to be either horizontal (thus providing vertical privacy) or vertical (thus providing horizontal privacy). Some non-zero or non-normal bias angle is often required for the LCF in order to minimize or eliminate Moiré(which may be caused by interference, e.g., between the pixel pitch in an LCD and the louver pitch of the LCF). The appearance of Moirémay be eliminated, for instance, by converting a horizontal or vertical LCF sheet into a sheet having a bias angle by cutting the sheet at an angle with respect to the louvers (i.e., where the louvers are neither parallel nor perpendicular to the edges of a regular quadrilateral part). If unaccounted for, reduced image quality can be caused by Moiré. Attempts to eliminate Moirécan lead to significant waste in converting LCF parts by cutting them to accommodate non-zero bias angles.

For purposes of this description, it is to be understood that a major viewing axis is the axis which runs parallel to the principal axis of the louvers. Therefore, in most cases, where the louvers run directly normal to the input and output surfaces of an LCF, the maximum brightness axis will also be normal to primary axis of the light output surface. However, where the louvers are biased at an angle, the maximum brightness axis will similarly be tilted at this angle with respect to the light input and output surfaces of the LCF. The transmission and effective viewing angles herein may thus be understood as measured with respect to normal to the LCF in most cases, or with respect to the major viewing axis in all cases.

The LCFs described herein are designed to ensure that the non-transmissive regions absorb as much of the non-viewable incident light as possible. This includes using an absorptive medium (e.g., carbon black), having a particle size small enough to pack the non-transmissive region so as to allow enough absorption to minimize light leakage. Highly absorptive non-transmissive regions minimize the amount of light that may leak through these regions, and therefore at least partially control the directionality and the privacy function of the LCF.

Incident light that is reflected from LCF non-transmissive regions described herein is also minimized to reduce spurious, or "ghost" images, that can arise from such reflections. This is done by ensuring that the index of refraction of the non-transmissive regions relative to the transmissive regions is selected so as to minimize such reflections (in particular, to minimize or eliminate TIR). For instance, in some embodiments, the index of refraction of the non-transmissive region, $N2$, is selected such that, in relation to the index of refraction of the transmissive region, $N1$, the relationship satisfies: $-0.005 < N2 - N1 < 0.005$.

An LCF can be placed between a viewer and an image plane of a display to limit the viewing angle of an image. Image planes can be included, for example, in a Liquid Crystal Display (LCD), a graphics display, and an indicia display.

As mentioned, the relative refractive indices of the non-transmissive and transmissive regions may be selected for the presently described LCFs. This selection may result in a reduction of ghost images produced by reflections within the LCF. When the refractive index of the transmissive region is less than the refractive index of the non-transmissive region, some of the light incident to the interface between them is refracted into the non-transmissive region and absorbed (Fresnel relations determine how much is absorbed and reflected as a function of angle of incidence and refractive index difference, with the highest amount of reflection occurring at or near so-called grazing angles). The refractive indexes of the two regions can be essentially "matched" so that the non-transmissive region refractive index is slightly higher than (if not equal to) the transmissive region, and reflections are essentially eliminated. More specifically, the indices of refraction should satisfy the following relationship: $-0.005 < N2 - N1 < 0$.

While the brightness of a display incorporating an LCF can be increased when incident light undergoes TIR from the interface between the non-transmissive and transmissive regions, this can lead to ghosting as described above. Whether a light ray will undergo TIR or not, can be determined from the incidence angle with the interface, and the difference in refractive index of the materials used in the transmissive and non-transmissive regions. When the refractive index of the non-transmissive region is no greater than the refractive index of the transmissive region, for instance the index of refraction of the transmissive region is greater than the index of refraction of the non-transmissive region by more than about 0.005, TIR may occur.

Figure 2:
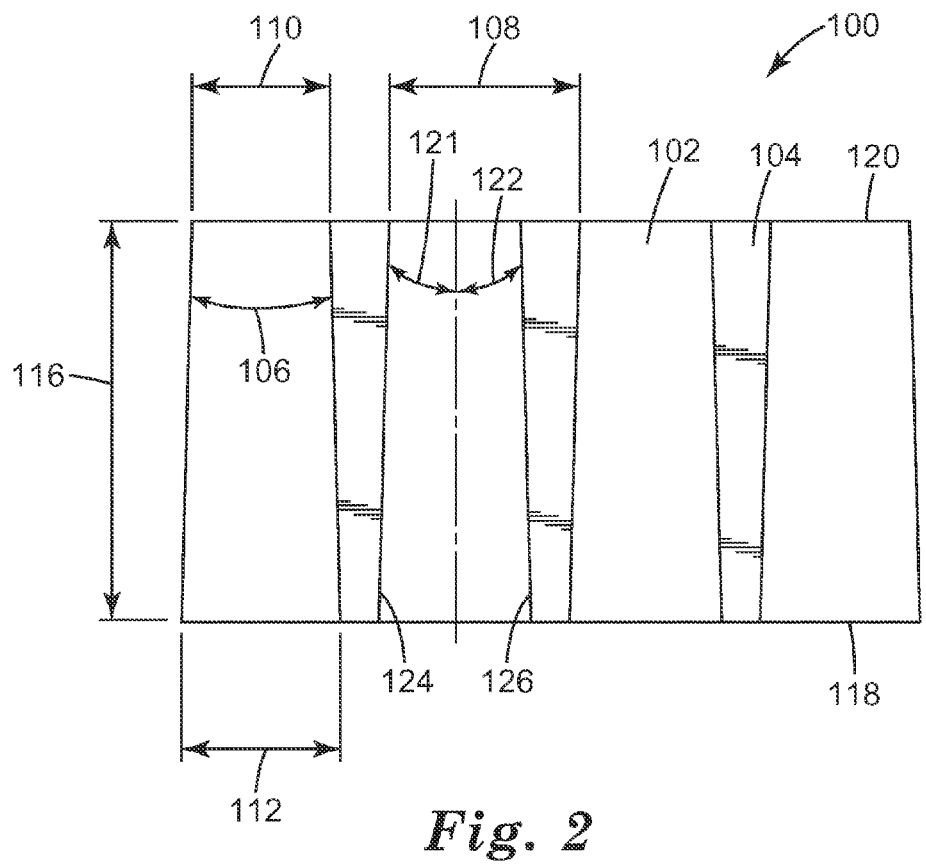
FIG. 2 is a cross-section view of an LCF

FIG. 2 shows a cross-sectional view of an LCF 100 that includes a light output surface 120 and a light input surface 118. While described herein as light input surface and light output surface for reference purposes, it will be recognized that in use, the LCFs described herein may have either a light output surface facing a viewer or a display source and the light input surface may either be facing a display source or a viewer. LCF 100 includes alternating transmissive regions 102, absorptive regions 104.

There are a number of geometric parameters and material properties than can affect the amount of transmission through an LCF film. Among these are included wall angle (of transmissive region wall with respect to opposite region wall) 106, pitch of successive transmissive regions 108 ("P") and transmissive region base width 112 ("W").

Transmissive regions may also be defined by a height 116 ("H"), which is equivalent to the distance from the light input surface 118 to the light output surface 120. LCFs can have relatively large included wall angles 106, such as greater than 10 degrees or more. Larger wall angles increase the width of the light absorbing regions, thereby decreasing transmission at normal incidence. Smaller wall angles are preferred, such as less than 10 degrees, so that the transmission of light at normal incidence can be made as large as possible. Diamond tools are contemplated as potential tools for creating a master used in microreplicating the LCFs herein. The value of the diamond angle will correspond, nearly identically, to the wall angles of the LCF. FIG. 1 illustrates a plot of the wall angle for a diamond tool used to microreplicate an LCF vs. the transmission of an LCF created therefrom. As is clearly indicated by FIG. 1, the level of transmission is highest at the lowest diamond angle, and decreases linearly as diamond angle increases. This corresponds to the relationship that a lower wall angle for the transmissive regions, and also therefore, for the non-transmissive regions, results in increased transmission from the LCF.

In some embodiments, LCFs described herein have an included wall angle 106 of not greater than 3°. In other embodiments, the included wall angle is not greater than 2°, such as up to 1.5°, 1.0°, 0.5°, 0.3°, 0.1°. In some cases the included wall angle may actually equal 0°. The LCF may be understood as having transmissive regions that each have a first and second interface with successive non-transmissive regions. For example, FIG. 2 illustrates a first interface 124 and a second interface 126. The first and second interfaces may be understood as intersecting the light output surface 120 at a first and second interface angle from the major viewing axis, 121 and 122 ($\theta_{I1}$ and $\theta_{I2}$) respectively. As described herein, the included wall angle 106 can be related to the interface angles for symmetric and asymmetric transmissive regions. In symmetric regions, first interface angle 121 ("$\theta_{I1}$") and second interface angle 122 ("$\theta_{I2}$") will be identical or nearly identical values. In asymmetric transmissive regions, first interface angle 121 and second interface angle 122 will consist of different values. In one aspect, one or both of the interface angles can be 1.5°, or not greater than 1.5°, for example not greater than 1.0°, 0.8°, 0.5°, 0.25°, or 0.1°. The interface angles may also be equal to 0°. It will be understood that the sum of the first interface angle 121 and second interface angle 122 will be equal to the wall value angle 106. Smaller wall angles can form grooves having a relatively high aspect ratio (H/W) at a smaller pitch "P", and can provide a sharper image cutoff at lower viewing angles. In some cases, the transmissive regions have an average height 116 ("H") and an average width at its widest portion, 112 ("W"), and H/W is at least 2.0. In some cases, H/W is at least 2.5, 3.0 or greater.

In order to enhance privacy functionality without a great deal of detriment to transmission levels, it may be desirable that the successive non-transmissive regions 104 have high aspect ratios, while the pitch of successive transmissive regions 108 be small. Specifically, the pitch can be 0.040 mm or less. Even more preferably, the pitch will be 0.036 mm or less.

A smaller included wall angle 106 and lesser pitch 108 allows for higher performance with a lesser height 116, (i.e., lesser distance from light input to light output surface). The height can be 0.10 mm or less. More preferably the height will be less than 0.080 mm or potentially less than 0.070 mm.

The transmissive region also is defined by an average width at its narrowest region 110 ("W'"). In cases where it is desired for the LCF to have a lower pitch and smaller wall angle without performance suffering, W' will be in a relationship with the pitch, P, such that W'/P is greater than 0.75. Even more preferably, W'/P will be greater than 0.80 or potentially even 0.090. W' measured alone will preferably be less than 0.030 mm.

The invention described herein may have a width at the narrowest region 110 (W'), at either the light input surface or light output surface, depending on the desired properties of the LCF. Correspondingly, the width at the widest region W, may similarly be located at either the light input surface or the light output surface (where regardless it will be at the opposite surface from W'). It may therefore be desirable to define a width at the light output surface, $W_O$ (e.g., 110) and a width at the light input surface, $W_I$ (e.g., 112) It is desired that the that widths at the two surfaces satisfy a relationship to the height of the transmissive region (or height of the LCF in general) such that H divided by the absolute value of $[W_O-W_I]$ is greater than 40. More preferably, H/absolute value of $[W_O-W_I]$ will be greater than 50, or, even more preferably, greater than 60.

The LCFs described herein can be made to have any desired polar viewing cutoff angle. In one aspect, the polar viewing cutoff angle ranges from 30° to 90° or even higher. The polar viewing cutoff angle $\Phi_P$ can be determined by utilizing the parameters of internal viewing cutoff angle-"$\theta_{Int}$", "H", "W", "P", and the indices of refraction of the LCF materials, as described in commonly owned application: PCT/US08/85889.

In some cases, it can also be useful to define an "effective polar viewing angle" (EPVA) which includes light transmitted through the LCF at angles larger than the polar viewing cutoff angle. For example, light that intercepts the non-transmissive regions at angles slightly larger than the internal viewing cutoff angle $\Phi_{Int}$ can "bleed through" the thinnest portions of the non-transmissive region (i.e., partially transmit through the top and bottom of the non-transmissive regions). Further, light traveling normal to the plane of the LCF may scatter and stray outside the effective polar viewing angle. The effective polar viewing angle as used herein is defined as the angle at which the relative brightness ratio decreases to 5% or less. The relative brightness ratio is the ratio (expressed as a percentage) of the brightness of a diffuse light source as measured through an LCF to the brightness of the same diffuse light source as measured without the LCF. For the LCFs described, herein, light exits the light ouput surface having a maximum relative brightness ratio (RBR) in a direction of the major viewing axis of 65 or greater. The LCF also has an EPVA of 45° or less. More preferably the LCF has an EPVA of 35° or less.

Also used in the art is the term "functional polar viewing angle" which also includes light transmitted through the LCF at angles larger than the polar viewing cutoff. The functional polar viewing angle is defined as the angle at which the brightness of the display with LCF decreases to a small percentage of the axial brightness of the display with LCF, for example 10%, 5% or even less. Such a view angle definition, however, may be display dependent.

Light absorbing materials for the non-transmissive regions in LCFs can be any suitable material that functions to absorb or block light at least in a portion of the visible spectrum. In some embodiments, the light absorbing material can be coated or otherwise provided in grooves or indentations in a light transmissive film to form non-transmissive regions. In further embodiments, light absorbing materials can include a black colorant, such as carbon black. The carbon black may be a particulate carbon black having a particle size less than 10 microns, for example 1 micron or less. The carbon black may, in some embodiments, have a mean particle size of less than 1 micron. In yet further embodiments, the absorbing material, (e.g., carbon black, another pigment or dye, or combinations thereof) can be dispersed in a suitable binder. Light absorbing materials also include particles or other scattering elements that can function to block light from being transmitted through the non-transmissive regions.

Reflections at the light transmissive region/non-transmissive region interface can be controlled by the relative index of refraction of the light transmissive material and the index of refraction of the non-transmissive material over at least a portion of the spectrum, for example the human visible spectrum. In some cases, the index of refraction of the cured transmissive regions (N1) is greater than the index of refraction of the non-transmissive regions (N2) by less than about 0.005. In such cases, the index of refraction difference, (N2−N1) is not less than −0.005, or, (N2−N1) is greater than or equal to −0.005. In other cases it may be desirable to have the index of refraction of the transmissive regions N1 and the index of refraction of the nontransmissive regions N2 be mismatched. This may be desirable, e.g., in a situation where total internal reflection is desired, such as when non-image light is being passed the film. An example of such an application includes providing the LCFs described herein as a component of a backlight in a transmissive LCD, where the LCF serves to collimate the source light before passing the light through the imaging transmissive LCD.

The LCFs described herein include a plurality of non-transmissive regions. In some embodiments, the non-transmissive regions can be a plurality of channels, as shown elsewhere in the description. In some cases, the LCF described herein can be combined with a second LCF, as described in U.S. Pat. No. 6,398,370 (Chiu et al.).

The polymerizable resin can comprise a combination of a first and second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition can comprise a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a UV curable resin. In some cases, polymerizable resin compositions useful for the LCF of the present description can include polymerizable resin compositions such as are described in U.S. Publication No. 2007/0160811 (Gaides et al.), to the extent that those compositions satisfy the index and absorption characteristics herein described.

A microstructure-bearing article can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The deposition temperature can range from ambient temperature to about 180° F. (82° C.). The master can be metallic, such as nickel, chrome- or nickel-plated copper or brass, or can be a thermoplastic material that is stable under the polymerization conditions, and has a surface energy that allows clean removal of the polymerized material from the master. One or more of the surfaces of the base film can optionally be primed or otherwise be treated to promote adhesion of the optical layer to the base.

The master negative may be formed using a high aspect ratio diamond tool. For instance, a diamond tool may be used to cut or form the master by a thread cutting process. Thread cutting, in which the diamond tool is advanced in the horizontal direction as the master is rotated in order to cut helical channels, may be preferable to plunge cutting, in which the diamond is plunged sequentially into adjacent sections of the master material, due to the ability to cut in short amounts of time. In order to achieve the desired small region angles and low pitch in the LCF which allow for thinner product constructions, cost reduction and accurate dimensions, the master used to replicate the LCF must be formed by a tool with a high aspect ratio and accurate dimensions. The use of such a tool ultimately results in greater dimensional accuracy of the LCF. Further the tool has a smooth finish which results in lower deformation of both the formed grooves and the tool itself In one embodiment, the tool will be a diamond tool.

Figure 3:
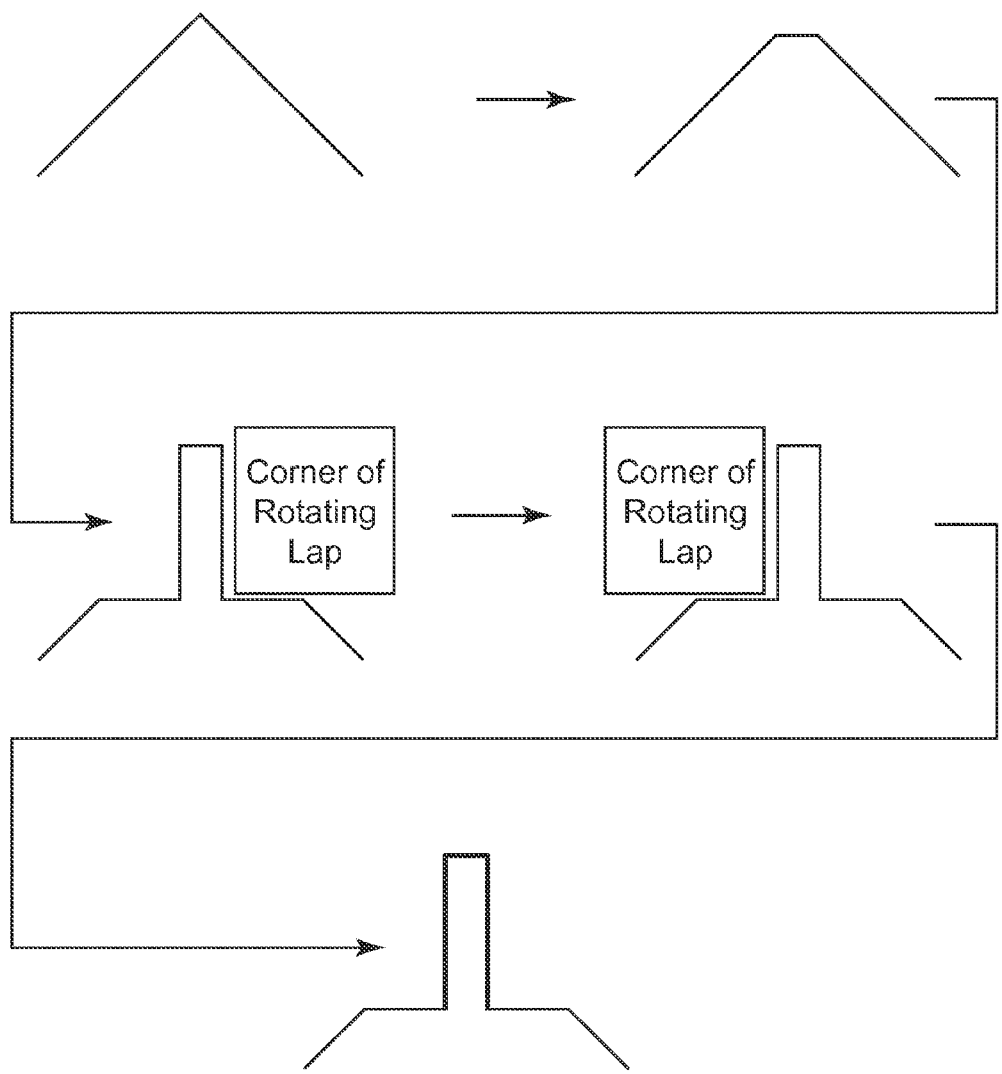
FIG. 3 illustrates a method for manufacturing a diamond tool for use in microreplicating LCFs.

In order to produce a diamond tool with the desired aspect ratio, dimensions, and smoothness, a particular process will preferably be used. FIG. 3 provides a flow chart illustrating such a process. The process begins with a v-shaped diamond having two facets. The typical angle might range from 15 to 90 degrees. The apex of the diamond is then lapped to produce a flat with a large amount of clearance, for example, 30 degrees. The flat should be of a size slightly larger (10 to 20 um) than the target for the final tool tip width when finished. Alternatively, the process may begin with a diamond that already has a flat formed on top of the two apexes. Next, the edge of a grinding wheel or scaif is used to quickly remove material by grinding through the first facet of the diamond. This step is followed by grinding or scaifing material away from the other facet of the diamond. One suitable tool for the grinding step is a Nanoform 200 diamond turning machine modified to be a precision lapping/grinding machine. The rotating lap is moved parallel to the flat through each facet until a column like structure is formed beneath the flat, which after this step should be even closer to the ultimate target flat width at completion (i.e., within 1-5 um). Finally, the column-like structure is milled with a focused ion beam milling process. The ion-milling process finishes the structure providing for a smooth finish on the cutting edge. The finished column will have a high aspect ratio and small angle between the side walls. Any negative master cut with the diamond tool and LCF microreplicated by the negative master should also exhibit the small wall angle, high aspect ratio, and smooth finish.

It is to be understood that the general shape of the diamond may be achieved by cutting the excess diamond material away through other methods, such as laser cutting.

The polymerizable resin compositions described herein are suitable for use in the manufacture of other light transmissive and/or micro structured articles including for example brightness enhancing films and the like. The term "microstructure" is used herein as defined and explained in U.S. Pat. No. 4,576,850 (Martens). Microstructures are generally discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations will typically be about +/−0.005 to +/−750 microns, as measured by an optical or electron microscope, through a representative characteristic length of the surface, e.g., 1-30 cm. The average center line can be plano, concave, convex, aspheric or combinations thereof Articles where the deviations are of low order, e.g., from +/−0.005, +/−0.1 or, +/−0.05 microns, and the deviations are of infrequent or minimal occurrence, i.e., the surface is free of any significant discontinuities, can be considered to have an essentially "flat" or "smooth" surface. Other articles have deviations are of high-order, e.g., from +/−0.1 to +/−750 microns, and attributable to microstructure comprising a plurality of utilitarian discontinuities which are the same or different and spaced apart or contiguous in a random or ordered manner.

It is to be understood that the light control film described herein may be used in conjunction with a base substrate layer, a polarizing or non-polarizing film, a polycarbonate film or substrate, and any other sort of film that desirably affects optical properties of light interacting therewith or material or mechanical properties of the film. Laminates and adhesives may also form part of such a film stack. For example, an optical cover film may be affixed to the light control film to the light output side of the LCF. This optical cover film can be the same material, or a different material than a base substrate layer. Materials for optical cover films or base substrate layers may include, for instance, commercially available polycarbonate films. The particular polycarbonate material may be selected so as to provide a matte finish or a glossy finish. Optional cover films can be bonded to the microstructured surface with an adhesive. Such an adhesive can be any optically clear adhesive, such as a UV-curable acrylate adhesive, a transfer adhesive, and the like.

For the purposes of this specification, it is to be understood that the distance from the light input surface to the light output surface, or, the height, H, is the distance from the two sides of the LCF itself. While the height of the potential stack of films may be greater than H, it is not to be considered a part of the LCF height for the purposes of the present description. In accordance with this understanding, the light input surface of the LCF is where light enters the LCF itself, not any other substrate or film in contact with the LCF. The light output surface is where light exits the LCF itself, not any other substrate or film in contact with the LCF.

The chemical composition and thickness of the base material can depend on the requirements of the product that is being constructed. That is, balancing the needs for strength, clarity, optical retardance, temperature resistance, surface energy, adherence to the optical layer, among others. In some cases, the thickness of the base layer can be at least about 0.025 millimeters (mm) and can be from about 0.1 mm to about 0.5 mm.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene, and polycyclo-olefins, polyimides, and glass. Optionally, the base material can contain mixtures or combinations of these materials. In one case, the base may be multi-layered or may contain a dispersed component suspended or dispersed in a continuous phase.

In one aspect, examples of base materials include polyethylene terephthalate (PET) and polycarbonate (PC). Examples of useful PET films include photograde polyethylene terephthalate, available from DuPont Films of Wilmington, Del. under the trade designation "Melinex 618". Examples of optical grade polycarbonate films include LEXAN® polycarbonate film 8010, available from GE Polymershapes, Seattle Wash., and Panlite 1151, available from Teijin Kasei, Alpharetta Ga.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

The base materials listed herein are not exclusive, and as will be appreciated by those of skill in the art, other polarizing and non-polarizing films can also be useful as the base for the optical products of the description. These base materials can be combined with any number of other films including, for example, polarizing films to form multilayer structures. The thickness of a particular base can also depend on the desired properties of the optical product.

As described throughout, the LCFs herein provide viewing cutoff angles that can provide privacy functionality in the direction perpendicular to the direction of the non-transmissive regions. This may be beneficial in privacy application, but also may be useful, for instance, in contrast enhancement for plasma display panels and in light collimating properties for automobile applications. In particular, many automobile instrument panels provide a lighted display, for instance, a liquid crystal display (LCD). The light from such displays may, however, reflect off of the front windshield, distracting or obstructing the view of the driver or passenger. Some LCFs described herein may provide relief from such front windshield reflection by cutting off light directed vertically.

It is beneficial, in some instances, to allow for more light to be observed in the direction parallel to the direction of the non-transmissive regions. For instance, in the automotive application described above, it may be beneficial to provide maximum brightness to the driver and the passenger in reading the display panel while limiting the amount of light reflecting from the front windshield. In some embodiments of the present description, the LCFs described herein allow for more light to transmit though the LCF in the louver direction (by louver direction, it is meant the direction parallel to the direction of the non-transmissive regions, regardless of whether in installation this represents a vertical or horizontal direction). This can be expressed as the minimum RBR value measured in the direction parallel to the louvers (non-transmissive regions), over a range of ±20° from normal (hereinafter referred to as MB20). In some embodiments of the LCFs described herein, the LCF has an MB20 of 60 or greater, for instance, 62 or greater, even 64 or greater.

Pixel Moiré

In general, privacy filters are converted at a bias angle to reduce or eliminate visible Moiré. One drawback to this approach is that cutting parts at an angle to the web direction can decrease yields and give uneven brightness profiles for viewers once the part is used in a display. The lower pitch of successive transmissive regions in the current invention creates a lesser or non-existent amount of Moiré without requiring significant bias angling. Less bias angling allows for higher brightness directed towards the viewer. This is beneficial, for example, in the automotive example described above, in which it is desirable to have higher brightness to a driver viewing the display, but also decrease the amount of off-axis light resulting in glare off of the windshield. One benefit of the light control films described herein is the ability to reduce or eliminate Moiré with a smaller, or potentially even zero degree bias angle.

EXAMPLES

A measurement of the described LCF's ability to decrease pixel Moiré was taken. The measurement was taken by qualitative human observations of the Moiré pattern when using the LCF on several different displays (Monitor, Notebook, and Hand Held) with a variety of pixel pitches. An LCF was placed on a display and rotated from a 0° bias angle to a bias where the Moiré effect was no longer visibly noticeable. The severity of the Moiré interference levels varied as the LCF was rotated from a 0° bias angle to a bias angle for extinction of Moiré, but beyond this angle, no Moiré was observed.

| LCF sample (pitch) | Hand Held (160 um) | Notebook (241 um) | Monitor (263 um) |
| --- | --- | --- | --- |
| LCF E (100 um) | 16.2° | 8.6° | 10° |
| LCF (71 um) | 11.5° | 8.4° | 5.9° |
| LCF (33 um) | 4.5° | 1.6° | 0° |

The value accompanying the LCF in the table represents the pitch of successive transmissive regions. The LCF sample with the smallest pitch allowed the smallest bias angle for extinction of Moiré

The present description should not be considered limited to the particular examples described herein, but rather should be understood to cover all aspects of the description as fairly set out in the attached claims. Various modifications, equivalent processes, as well as numerous structures to which the present description can be applicable will be readily apparent to those of skill in the art to which the present description is directed upon review of the instant specification.

We claim:

1. A light control film, comprising:
   a light input surface and a light output surface opposite the light input surface; and
   alternating transmissive and non-transmissive regions disposed between the light input surface and the light output surface, each transmissive region having a width, W', at its narrowest region;
   wherein the average pitch of successive transmissive regions, P, is 0.040 mm or less; and
   wherein W'/P>0.75; and
   wherein light incident on the light input surface exits the light output surface having a maximum relative brightness ratio (RBR) in the major viewing axis direction of 65 or greater and an effective polar viewing angle (EPVA) of 45° or less.

2. The light control film of claim 1, wherein W'/P>0.80.

3. The light control film of claim 1, wherein light incident on the light input surface exits the light output surface having an effective polar viewing angle (EPVA) of 35° or less.

4. The light control film of claim 1, wherein each transmissive region has an index of refraction N1, and each non-transmissive region has an index of refraction N2, where $-0.005 < N1 - N2 < 0$.

5. The light control film of claim 1 wherein each non-transmissive region comprises an optically absorptive material selected from a pigment, a dye, or a combination thereof.

6. The light control film of claim 1, wherein W' is 0.030 mm or less.

7. The light control film of claim 1, wherein the transmissive region further comprises a width at its widest region, W, wherein W−W' is less than 5 μm.

8. A light control film, comprising:
   a light input surface and a light output surface opposite the light input surface; and
   alternating transmissive and non-transmissive regions disposed between the light input surface and the light output surface;
   wherein the average pitch of successive transmissive regions is 0.040 mm or less; and
   wherein light incident on the light input surface exits the light output surface having a maximum relative brightness ratio (RBR) in the major viewing axis direction of 65 or greater and an effective polar viewing angle (EPVA) of 45° or less.

9. The light control film of claim 8, wherein the distance from the light input surface to the light output surface is less than 0.080 mm.

* * * * *